(12) United States Patent
Blundell (10) Patent No.: US 10,579,800 B2
(45) Date of Patent: Mar. 3, 2020

(54) REMOTE ATTESTATION OF CLOUD INFRASTRUCTURE

(71) Applicant: 100 PERCENT IT LTD, Newbury, Berkshire (GB)

(72) Inventor: David Blundell, Eastbury (GB)

(73) Assignee: 100 Percent IT Ltd, Newbury, Bershire (GB)

(*) Notice: Subject to any disclaimer, the term of this patent is extended or adjusted under 35 U.S.C. 154(b) by 0 days.

(21) Appl. No.: 16/092,752

(22) PCT Filed: Apr. 11, 2017

(86) PCT No.: PCT/GB2017/051011
§ 371 (c)(1),
(2) Date: Oct. 10, 2018

(87) PCT Pub. No.: WO2017/178811
PCT Pub. Date: Oct. 19, 2017

(65) Prior Publication Data
US 2019/0138729 A1    May 9, 2019

(30) Foreign Application Priority Data

Apr. 11, 2016 (GB) .................................. 1606131.9

(51) Int. Cl.
*H04L 29/08* (2006.01)
*H04L 9/32* (2006.01)
(Continued)

(52) U.S. Cl.
CPC .......... *G06F 21/57* (2013.01); *G06F 9/45558* (2013.01); *G06F 11/16* (2013.01);
(Continued)

(58) Field of Classification Search
CPC .... G06F 21/57; G06F 9/45558; G06F 21/575; G06F 21/53; G06F 2009/45562;
(Continued)

(56) References Cited

U.S. PATENT DOCUMENTS 8,656,482 B1 * 2/2014 Tosa ........................ H04L 63/08
713/153
2006/0005009 A1 * 1/2006 Ball ........................ G06F 21/57
713/155

(Continued)

OTHER PUBLICATIONS

VICCI: A Programmable Cloud-Computing Research Testbed by Larry Peterson, Andy Bavier, Sapan Bhatia; Princeton University, Sep. 7, 2011, pp. 1-16.*

(Continued)

*Primary Examiner* — Mohammad A Siddiqi (57) ABSTRACT

A system which provides remote attestation of a cloud infrastructure comprises a plurality of attestation servers, a virtual machine (VM), and a VM scheduler arranged to register the VM for attestation and deploy the VM to a VM host within the cloud. More than one of the plurality of attestation servers are selected and mapped to the deployed VM, and each of the more than one mapped attestation servers is arranged to collect perform remote attestations of the deployed VM and its VM host. Performing remote attestations comprises transmitting a request for trust evidence to the VM and VM host, receiving, storing trust evidence transmitted by the VM and VM host and transmitting VM and VM host trust evidence to a cloud user.

22 Claims, 8 Drawing Sheets

(51) Int. Cl.
    *G06F 21/57*     (2013.01)
    *G06F 9/455*     (2018.01)
    *G06F 11/16*     (2006.01)
    *H04L 29/14*     (2006.01)

(52) U.S. Cl.
    CPC ............ *H04L 9/3234* (2013.01); *H04L 67/10* (2013.01); *G06F 2009/4557* (2013.01); *G06F 2009/45587* (2013.01); *G06F 2221/034* (2013.01); *G06F 2221/2115* (2013.01); *H04L 69/40* (2013.01); *H04L 2209/127* (2013.01)

(58) Field of Classification Search
    CPC ....... G06F 9/45554; G06F 2009/45587; H04L 9/3234; H04L 67/10
    See application file for complete search history.

(56) References Cited

U.S. PATENT DOCUMENTS

| | | | |
|---|---|---|---|
| 2008/0189468 | A1 | 8/2008 | Schmidt et al. |
| 2009/0204964 | A1* | 8/2009 | Foley ...................... G06F 21/53 718/1 |
| 2013/0054948 | A1* | 2/2013 | Raj ..................... G06F 9/45558 713/2 |
| 2015/0244617 | A1* | 8/2015 | Nakil .................. G06F 9/45558 709/224 |
| 2016/0277498 | A1* | 9/2016 | Kulkarni ............. H04L 67/1097 |
| 2017/0364685 | A1* | 12/2017 | Shah ...................... G06F 21/53 |

OTHER PUBLICATIONS

Imad M. Abbadi et al., "Towards Trustworthy Resource Scheduling in Clouds", IEEE Transactions on Information Forensics and Security, IEEE, Piscataway, New Jersey, vol. 8, No. 6, Jun. 1, 2013, pp. 973-984.

Juan Du et al., "Adaptive data-driven service integrity attestation for multi-tenant cloud systems", Quality of Service (IWQOS), 2011 IEEE 19th International Workshop ON, IEEE, Jun. 6, 2011, pp. 1-9.

Jamkhedkar Pramod et al., "A Framework for Realizing Security on Demand in Cloud Computing", 2013 IEEE 5th International Conference on Cloud Computing Technology and Science, IEEE, vol. 1, Dec. 2, 2013, pp. 371-378.

Anbang Ruan et al., "RepCloud: Achieving Fine-grained Cloud TCB Attestation with Reputation Systems", Scalable Trusted Computing, ACM, Chicago, Illinois, Oct. 17, 2011, pp. 3-14.

Joshua Schiffman et al., "Seeding clouds with trust anchors", Proceedings of the 2010 ACM Workshop on Cloud Computing Security Workshop, CCSW '10, ACM Press, Oct. 8, 2010, pp. 43-46.

PCT International Search Report and the Written Opinion dated Jul. 7, 2017, issued in corresponding International Application No. PCT/GB2017/051011 (17 pages).

Combined Search and Examination Report dated Sep. 6, 2016, issued in related British Application No. GB1606131.9 (5 pages).

Intention to Grant dated Aug. 21, 2018, issued in related British Application No. GB1606131.9 (2 pages).

* cited by examiner

REMOTE ATTESTATION OF CLOUD INFRASTRUCTURE

CROSS REFERENCE TO RELATED APPLICATION

This application is a national stage application under 35 U.S.C. § 371 of PCT Application No. PCT/GB2017/051011, filed on Apr. 11, 2017, which claims the benefit of priority to British Application No. GB1606131.9, filed on Apr. 11, 2016, the contents of which are hereby incorporated by reference in their entirety.

TECHNICAL FIELD

The invention relates to the remote attestation of a cloud infrastructure. In particular embodiments, the invention may relate to the remote attestation of a cloud infrastructure using a plurality of attestation servers.

BACKGROUND

Security concerns have become the key barrier to the adoption of cloud computing technologies. Security enhancements are drawn from a variety of paradigms. However, most of these are implemented as parts of the cloud systems' SLA (Service Level Agreements). It is thus difficult for the Cloud Service Providers (CSPs) to assure their customers that their advertised services, including these security enhancements, are genuinely present and performing as expected. This is a particular issue for customers who handle sensitive data or are themselves subject to strict contractual or regulatory requirements (for example, financial institutions and law firms). Consequently, effective trust establishment remains a main challenge for CSPs.

In order to address this issue, the Trusted Cloud concepts have been developed. These are built on Trusted Computing technologies which enable remote attestations to examine and confirm the genuine behaviours of a cloud infrastructure. Trusted Computing is a series of specifications defined by the TCG (Trusted Computing Group), an international industry standards group. Trusted Computing relies on a secure hardware device, the TPM (Trusted Platform Module), which is attached to a computing platform to reliably record and report the loaded software systems on the platform. The TPM is an international standard for a secure cryptoprocessor, which secures hardware by integrating cryptographic keys into devices. The TPM's relative tamper-proof nature and built-in cryptographic protocols enable it to act as a Root-of-Trust (RoT) at the base of the system. Starting from this RoT, a Chain-of-Trust (CoT) is built by iteratively attesting to the trustworthiness of the higher layers. Remote attestation is implemented to securely fetch the trust evidence (i.e. the measurement values) maintained by the RoT and reliably determine the genuine behaviours, or the properties, of every component recorded within the CoT.

Existing Trusted Cloud solutions generally employ a centralized architecture. A central attestation server (e.g. the OpenAttestation, or OAT) gathers the TPM-generated trust evidence from each node to ensure that the node has the required properties, such as deployment with the expected software components, or correct configuration. When deploying Virtual Machines (VMs) to the cloud, customers may register with the OAT the desirable properties for the expected hosting infrastructure. The OAT will in turn enforce continuous attestations to examine the VMs' correct deployment status. Customers can further attest or verify the OAT server's integrity to confirm that their VMs are secure and the services they purchased are trustworthy. However, there are many limitations with existing solutions, especially when the attestation service is scaled up.

For example, in existing Trusted Cloud deployments the central attestation server is in charge of attesting the entire infrastructure and hence has become a single-point-of-failure. Any faults will therefore inevitably disrupt the trust services, especially when more security management services are built on the trustworthiness semantics. This service will also become the main target for attackers. Any malicious insiders who have gained administrator privileges to this single service will also have more capabilities to manipulate the entire cloud's trustworthiness status.

A further limitation of existing solutions is scalability. When the central attestation server or OAT expands to serve more VMs or a larger cloud infrastructure, it quickly becomes a performance bottleneck. On the other hand, when multiple OATs are created to attest different parts of a large infrastructure, the management complexity increases because customers have to be constantly aware of the correct part for each of their VMs.

Existing solutions also often exhibit a weak chain-of-trust. In order to attest the genuine behaviours of a VM, the VM's virtual TPM (vTPM) must be linked to the underlying physical TPM (Trusted Platform Module). This means the VM's owner must be able to contact the corresponding physical TPM. However, this is particularly difficult as revealing the identities of underlying TPMs exposes the cloud's internal structure. This breaks the cloud's transparency promises and also facilitates co-location attacks. Therefore, the current OAT system does not support attestations of a VM's underlying host.

Dynamism is also an issue for existing Trusted Cloud deployments, since VMs migrate among hosts and the linkages between the vTPMs and the underlying physical TPMs are rebuilding constantly. Managing these frequent updates places an overhead on the customers. It further reveals the internal dynamisms of the cloud infrastructure. Therefore, the current OAT system does not support attestations of migrating VMs.

SUMMARY

According to a first aspect there is provided a system arranged to provide remote attestation of a cloud infrastructure, comprising a plurality of attestation servers located outside the cloud; a virtual machine (VM); and a VM scheduler arranged to register the VM for attestation and deploy the VM to a VM host within the cloud. More than one of the plurality of attestation servers are selected and mapped to the deployed VM and each of the more than one mapped attestation servers is arranged to collect perform remote attestations of the deployed VM and its VM host. Performing remote attestations comprises transmitting a request for trust evidence to the VM and VM host, receiving and storing trust evidence transmitted by the VM and VM host and transmitting VM and VM host trust evidence to a cloud user.

The system may further comprise a cloud infrastructure.

The VM may be configured to be mapped to more than one of the plurality of attestation servers using a distributed hash table (DHT) algorithm, such that attestation responsibilities are substantially evenly distributed among the plurality of attestation servers.

Each of the more than one attestation servers may be configured to store collected trust evidence from its mapped VM and VM host.

Each of the plurality of attestation servers may be arranged to comprise a user query service, such that a cloud user can retrieve the stored trust evidence.

The stored trust evidence may comprise metadata, such that the VM host's real identity is not retrievable by the cloud user.

Each of the plurality of attestation servers may be configured to be assigned to an attack zone within the cloud infrastructure, wherein an attack zone comprises a set of attestation servers controlled by a single administrator.

The VM scheduler may be configured to receive an attestation profile from a cloud user, the attestation profile specifying how attestation of the cloud user's VM and VM host is to be performed.

Each of the more than one attestation servers may be configured to receive and store the attestation profile for its mapped VM.

Each of the plurality of attestation servers may be configured to verify that an attested VM host is in fact hosting the mapped VM.

When a VM is migrated within the cloud between an origin VM host and a target VM host, each of the more than one attestation servers that are mapped to that VM may be configured to attest the target VM host prior to migration of the VM.

A cloud user may be provided with trust evidence for each of the more than one attestation servers which are mapped to that cloud user's VM.

The system may be configured to enable deregistration of a deployed VM, wherein the more than one attestation servers mapped to the VM are informed of the deregistration after the VM has been removed from its VM host by the VM scheduler.

The system may be configured such that, when using keys managed by a Trusted Key Management system to encrypt block storage, the system facilitates storage of the trusted encrypted block; or when using keys managed by a Trusted Key Management system to encrypt object storage, the system facilitates storage of the trusted encrypted object; stored data can only be decrypted by the VM passing the attestations against predefined white-lists.

The system may be configured such that, when using the system to attest VMs launched inside a Software Guard Extension (SGX) or other type of trusted enclave, applications inside the VMs are protected from malicious memory tampering or eavesdropping.

According to a second aspect there is provided a system arranged to provide remote attestation of a cloud infrastructure, comprising a plurality of attestation servers; a physical host configured to run data within a cloud; and a scheduler arranged to register the physical host for attestation. More than one of said plurality of attestation servers are selected and mapped to the physical host and each of the more than one mapped attestation servers is arranged to collect trust evidence for its mapped physical host.

According to a third aspect there is provided an attestation server arranged to be mapped to a virtual machine (VM) deployed by a cloud user to a VM host within a cloud infrastructure, the attestation server configured to receive VM and VM host identity data from a VM scheduler; request trust evidence from a mapped VM and its host; store the received trust evidence; and transmit the stored trust evidence to the cloud user.

According to a fourth aspect there is provided a method of remotely attesting a cloud infrastructure, the method comprising registering a virtual machine (VM) for attestation with a VM scheduler; deploying the VM to a VM host within the cloud infrastructure using the VM scheduler; selecting a plurality of attestation servers to be mapped to the VM using the VM scheduler; mapping the plurality of selected attestation servers to the VM using the VM scheduler; performing remote attestations of the VM and its VM host using the plurality of mapped attestation servers. Performing remote attestations comprises transmitting a request for trust evidence to the VM and VM host, receiving and storing trust evidence transmitted by the VM and VM host; and transmitting VM and VM host trust evidence to a cloud user.

The method may further comprise transmitting the VM and VM host identity data to the plurality of mapped attestation servers; and confirming registration of the VM using the VM scheduler.

The method may further comprise selecting the plurality of attestation servers to be mapped to the VM using a Distributed Hash Table (DHT) algorithm.

The method may further comprise requesting trust evidence from the deployed VM; retrieving the identities of the plurality of mapped attestation servers and attesting the plurality of mapped remote attestation servers; requesting and receiving stored trust evidence from the plurality of mapped attestation servers.

The method may further comprise migrating the deployed VM from an original VM host to a destination VM host by retrieving the identity of the destination host using the VM scheduler; retrieving the identities of the plurality of mapped attestation servers using the VM scheduler; retrieving trust evidence for the original and destination VM hosts from the plurality of mapped attestation servers using the VM scheduler; preparing a migration of the VM to the destination host, using the VM scheduler; the step of preparing comprising; attesting the original VM host and transmitting original VM host trust evidence to the VM scheduler, using the plurality of mapped attestation servers; migrating the VM from the original VM host to the destination VM host, using the scheduler; informing the plurality of mapped attestation servers that the migration is complete, using the VM scheduler; instructing the plurality of mapped attestation servers to attest only the destination host; and attesting the destination VM host and transmitting destination VM host trust evidence to the VM scheduler, using the plurality of mapped attestation servers.

The method may further comprise deregistering the deployed VM, by receiving a request at the VM scheduler for deregistration of a VM for attestation; removing the VM from its VM host, using the VM scheduler; identifying the plurality of mapped attestation servers' identities, using the VM scheduler; informing the plurality of mapped attestation servers to stop attesting the VM, using the VM scheduler; and reporting that deregistration is complete, using the VM scheduler.

The method may further comprise receiving an attestation profile from a cloud user using the VM scheduler, the attestation profile specifying how attestation of the cloud user's VM and VM host is to be performed, wherein performing remote attestations further comprises attesting the VM and VM host using the attestation profile.

The attestation profile may comprise a white list which records the expected applications and configurations that are allowed to be loaded inside the VM, and the method may comprise shutting down the VM and notifying the cloud user when applications and/or configurations not recorded by the white list are detected.

The method may further comprise automatically generating white lists by repeatedly attesting the VM using the plurality of mapped attestation servers while tracking applications and configurations as they are installed onto the VM.

The method may further comprise only allowing a VM to connect to a server if both the VM and the server are compliant with the white list.

According to a fifth aspect there is provided a computer program comprising instructions which, when executed on at least one processor, cause the at least one processor to carry out the method of the fourth aspect above.

According to a sixth aspect there is provided a computer program product comprising a computer program as claimed the fifth aspect above.

According to a seventh aspect there is provided a carrier containing the computer program of the fifth aspect above, wherein the carrier is one of an electronic signal, optical signal, radio signal, or non-transitory computer readable storage medium.

According to an eighth aspect there is provided a method of providing data covering a VM's lifecycle within the cloud, the method comprising: retrieving and storing trust evidence according to the method of the fourth aspect above; using the trust evidence to produce an audit trail for that VM; and transmitting the audit trail to a cloud user.

BRIEF DESCRIPTION OF THE FIGURES

Exemplary embodiments of the invention are disclosed herein with reference to the accompanying drawings, in which.

DETAILED DESCRIPTION

Generally, disclosed herein are methods and systems of providing distributed trusted computing. In particular, the methods and systems disclosed may enable remote attestation or authentication of a Cloud Service Provider's infrastructure and an end user's (customer's) virtual machine and/or its host. Exemplary methods and systems may also permit live migrations of virtual machines between hosts without downtime.

A distributed attestation system (a Distributed OAT) provides multiple arrays of attestation servers, or "workers", to attest the cloud infrastructure. These attestation servers are deployed in hierarchical defined attack zones. At the top layer, the servers are owned by different Trust Service Providers (TSP). Each TSP then defines its own attack zone hierarchy, to reflect its internal security structure so that attestation servers in different zones are not exposed to the same attacks.

An attack zone represents a region of availability for the attestation servers that could be disrupted by a well-placed individual e.g. if all of the attestation servers for a Trust Service Provider can be compromised by a single administrator, there is one attack zone. If the Trust Service provider has different administrators controlling the servers in each of two data centres then there are two attack zones.

An attestation server receives an attestation request from a cloud user (customer) via a scheduler, then transmits a request for data or metadata to a device (e.g. a virtual machine, a virtual machine's hosting node). The information requested may be at least in part specified by a customer, depending upon their requirements. This may be done in the form of an attestation profile. The request may be submitted via a web interface. The attestation server then receives and stores data or metadata from the device and transmits the received data or metadata to the cloud user when requested.

Each virtual machine (VM) is mapped to a set of servers by a Distributed Hash Table (DHT) algorithm. Each attestation server is only responsible for attesting its mapped VM's hosting node (i.e. the host), as opposed to the centralized OAT system whose attestation service attests all hosts in a cloud infrastructure.

The DHT algorithm will make sure that the attestation responsibilities are pseudo-randomly and (nearly) evenly distributed among the workers from a same attack zone; and that customers have the flexibility to define their own attestation redundancy policy, so that each of their VMs will be attested by multiple attestation servers from different attack zones.

Each attestation server actively gathers the information of its mapped VMs' hosting nodes (i.e. their hosts) and actively collects the trust evidence of the hosts by performing remote attestations. In this context, "remote" relates to the attestation server being external to the server/VM/VM host being attested. Attestation servers may be located inside or outside of the cloud. The servers store locally the collected trust evidence for each of its mapped VMs and implement services such as a user query service to allow end users (e.g. the cloud customers) to query the trust evidence for their VMs' hosts. Each server also allows the end users to examine the server's own integrity. Users/customers may access the evidence via a web interface, for example. Access to the trust evidence may not be restricted to cloud users (i.e. VM owners) but may also be provided to trusted third parties for authentication or regulation purposes.

To attest a VM and its underlying host with the distributed attestation system described herein, the customer firstly calculates the identities of their VM's associating attestation servers using the DHT algorithm. They then attest the integrity of these servers and query the servers directly for the VM's host's trust evidence. With the host's integrity verified, the customer may now examine the VM's properties by interrogating the VM's vTPM facilities.

Since multiple attestation servers are employed and redundant servers are assigned for attesting each VM's host, the distributed attestation system provides resiliency as there is no single-point-of-failure, in contrast with existing centralized attestation servers. Additionally, as multiple and potentially competing TSPs are introduced, "dishonest" servers become easier to identify.

The distributed attestation system is also scalable, as the DHT algorithm automatically distributes the attestation load and responsibility evenly among the attestation servers.

Adding or removing servers to or from any TSP's attack zone hierarchy will trigger automatic load-balancing among the existing servers. This makes sure that attestation responsibilities are always evenly distributed.

The distributed attestation system also enforces a strong chain-of-trust, as customers are able to examine the detailed properties of a VM's underlying host. Each server attests its mapped VMs' host and returns the resulting trust evidence to the customers, but without revealing the host's real identity.

Since the VMs' vTPMs are mapped to a stable set of physical TPMs (i.e. the server's TPMs), the distributed attestation system is adaptive to the cloud's dynamism. The management complexity for the mapping between VMs and attestation servers is also greatly reduced, as each customer determines its VMs' associated attestation servers independently with the DHT algorithm.

Cloud users are able upload encrypted data and disk images to the cloud along with a separate decryption/encryption key. The key is protected by a Trusted Platform Module (TPM) which means the Service Provider can only ever see the encrypted disk image and does not have access to the key needed to decrypt the data. The distributed attestation system further provides transparency and a cryptographically verifiable audit trail of everything that has happened to a customer's data. Trusted third parties and the cloud users themselves can remotely verify that the underlying software running on the cloud is exactly the same software that has been independently audited. This remote attestation system also allows verification that the underlying cloud software is patched, up to date and has no known security flaws. This facility for external third party verification enables customers to be confident that the SP and any unauthorised third parties physically cannot access their data. The software running in the user's VMs can be verified in the same way.

In an embodiment, a distributed attestation system arranged to provide remote attestation of a cloud infrastructure may therefore comprise a plurality of attestation servers and a VM scheduler arranged to register a VM for attestation and deploy the VM to a VM host within the cloud. One or more of the plurality of attestation servers are selected and mapped to the deployed VM and each of the more than one mapped attestation servers is arranged to perform remote attestations of the deployed VM and its VM host. Optionally, the system may further comprise a VM (virtual machine).

Figure 1:
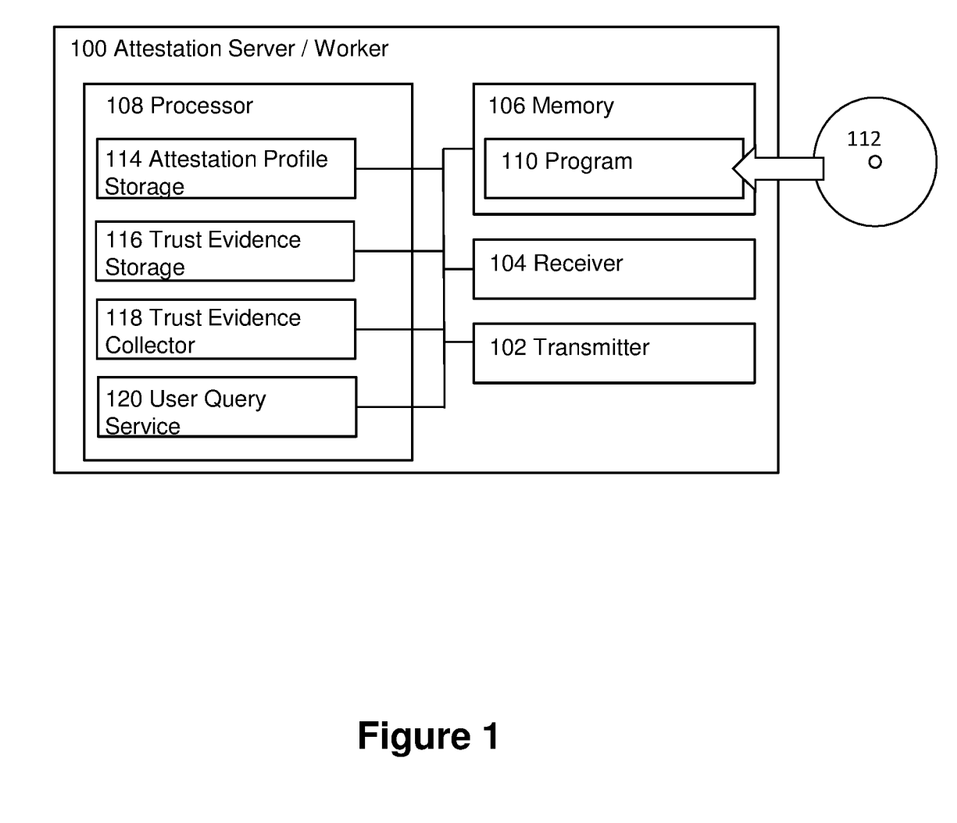
FIG. 1 is an architecture of a distributed attestation system.
Figure 2:
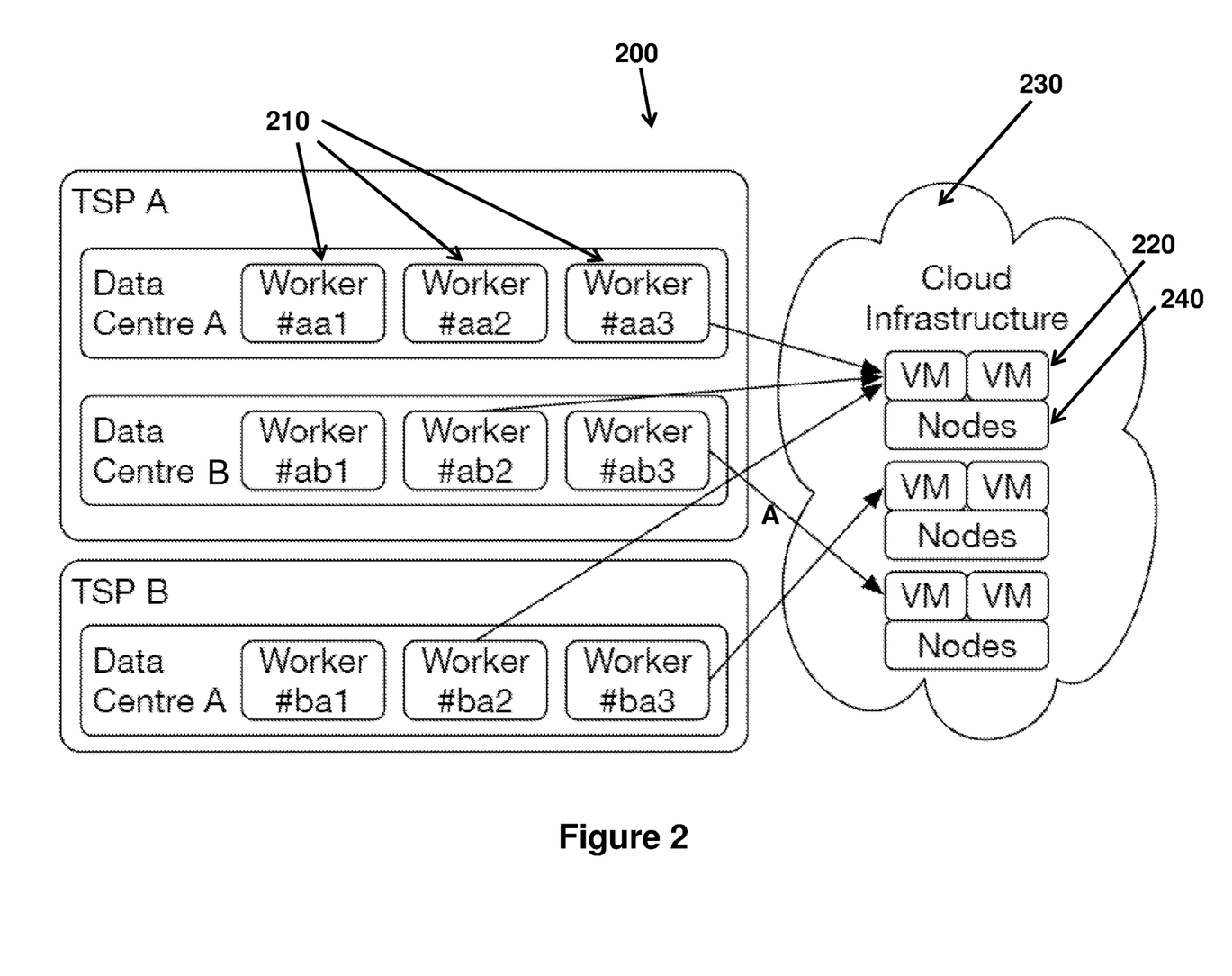
FIG. 2 is a schematic diagram of a remote attestation server.

FIG. 1 illustrates a schematic representation of an attestation server or "worker" 100, which may be the worker 210 of FIG. 2. The worker 100 may run on physical or virtual hardware. The worker 100 comprises a transmitter 102 and a receiver 104. The transmitter 102 and receiver 104 may be in data communication with other network or cloud entities such as VMs, VM's hosts and VM schedulers and/or functions in a computer network or cloud and is configured to transmit and receive data accordingly. The worker 100 further comprises a memory 106 and a processor 108. The memory 106 may comprise a non-volatile memory and/or a volatile memory. The memory 106 may have a computer program 110 stored therein. The computer program 110 may be configured to undertake the methods disclosed herein. The computer program 110 may be loaded in the memory 106 from a non-transitory computer readable medium 112, on which the computer program is stored. The processor 108 is configured to undertake one or more of the functions of attestation profile storage 114, trust evidence (e.g. identity data or metadata) storage 116, trust evidence collector 118 and user query service 120, as described herein.

Each of the transmitter 102 and receiver 104, memory 106, processor 108, attestation profile storage 114, trust evidence storage 116, trust evidence collector 118 and user query service 120 is in data communication with the other features 102, 104, 106, 108, 110, 112, 114, 116, 118, 120 of the attestation server or worker 100. The worker 100 may be implemented as a combination of computer hardware and software. In particular, attestation profile storage 114, trust evidence storage 116, trust evidence collector 118 and user query service 120 may be implemented as software configured to run on the processor 108. The memory 106 stores the various programs/executable files that are implemented by a processor 108, and also provides a storage unit for the required data. The programs/executable files stored in the memory 106, and implemented by the processor 108, can include trust evidence collector 118 and user query service 120, but are not limited to such.

The general conceptual model for an exemplary distributed remote attestation system 200 will now be described with reference to FIG. 2. FIG. 2 illustrates how the attack zone hierarchy is constructed and maintained. For example, it can be seen that each VM 220 within the cloud 230 infrastructure is mapped to, and is in data communication with, multiple attestation servers or workers 210, providing redundancy and increased security. In FIG. 2, the mapping between workers 210 and VMs 220 is indicated by arrows, for example, the mapping between worker # ab3 and its VM is indicated by arrow A. Ideally, the workers/servers 210 mapped to a VM 220 are in geographically diverse locations in different attack zones.

As previously discussed, these workers 210 may be owned by different Trust Service Providers (TSPs e.g. cyber security firms) e.g. TSP A and TSP B. The workers 210 need not necessarily be co-located e.g. worker # aa1, # aa2 and # aa3 form part of Data Centre A, while workers # ab1, # ab2 and # ab3 form part of Data Centre B. The workers 210 provide remote attestation of both their mapped or bound VMs 220 and the mapped VMs' hosting node or host 240. In this context, remote means that the attestation server is external to the server/VM/VM host being attested. The attestation server may be outside the cloud infrastructure. However, in other embodiments, the attestation servers may be inside the cloud infrastructure.

The system 200 described herein utilizes, but is not restricted to, the CRUSH (Controlled Replication Under Scalable Hashing) algorithm as its DHT algorithm for calculating the VM to attestation server mapping. CRUSH is a hash-based algorithm used to calculate how and where to store and retrieve data in a distributed object-based storage cluster. CRUSH was designed for Ceph, an open source software designed to provide scalable object-, block- and file-based storage under a unified system. CRUSH maps the identity of a piece of customer data to a set of Object-based Storage Devices (OSDs), with help from a system-defined CRUSH Map and a customer defined Rule Set. OSDs are organized in "buckets", which are logical containers representing a similar configuration. "Buckets" are further organized in hierarchies to reflect the actual deployment topology of the OSDs. This organization is defined by the CRUSH Map. The CRUSH Map assists customers in designing their data placement policies, such as specifying the locations of the data replications. These per-customer policies are defined as the Rule Set.

The distributed attestation system 200 described herein adapts the CRUSH Map to model its attack zone hierarchy: the Server Map (M). Each attack zone is a counterpart of a "bucket". The OSD management protocols are used to add (or remove) an attestation server 210 to (or from) an existing attack zone. Whenever a server 210 joins or leaves, the attack zones in the same level reshuffle all the servers' 210 data using the CRUSH algorithm. This automatically redistributes the servers' 210 attestation responsibilities.

An attestation server 210 of the distributed attestation system 200 is therefore representative of a Ceph's OSD. Instead of storing arbitrary customer data, however, each attestation server 210 or worker ($w_j$) stores a list of fixed-structured worker entries, recoding its managed VMs' 220 identity and trustworthiness data. In particular, each entry $w_j$ [i] (i.e. the recoded identity data for the VM 220 ($VM_k$) mapped to that worker wj) contains:

1) the $VM_k$ identity metadata ($VID_k$), an implementation-specific unique and immutable ID;
2) $VM_k$'s attestation profile ($PF_k$), which specifies how the attestation will be performed (e.g. minimum intervals, expected white-lists, etc.);
3) $VM_k$'s host's identity metadata ($HID_k$), including its network location, AIK certificate (the Attestation Identity Key used to verify the signature generated by a TPM), etc.; and
4) $VM_k$'s host's attestation tickets ($TK_k$), which could be translated as properties.

$$w_j[i]=(VID_k, PF_k, HID_k, TK_k)$$

An attestation ticket contains the hash giving the status of the host e.g. its software status. It is signed by a TPM or vTPM. A collection of tickets provides the trust evidence for a particular VM or VM host.

Figure 3:
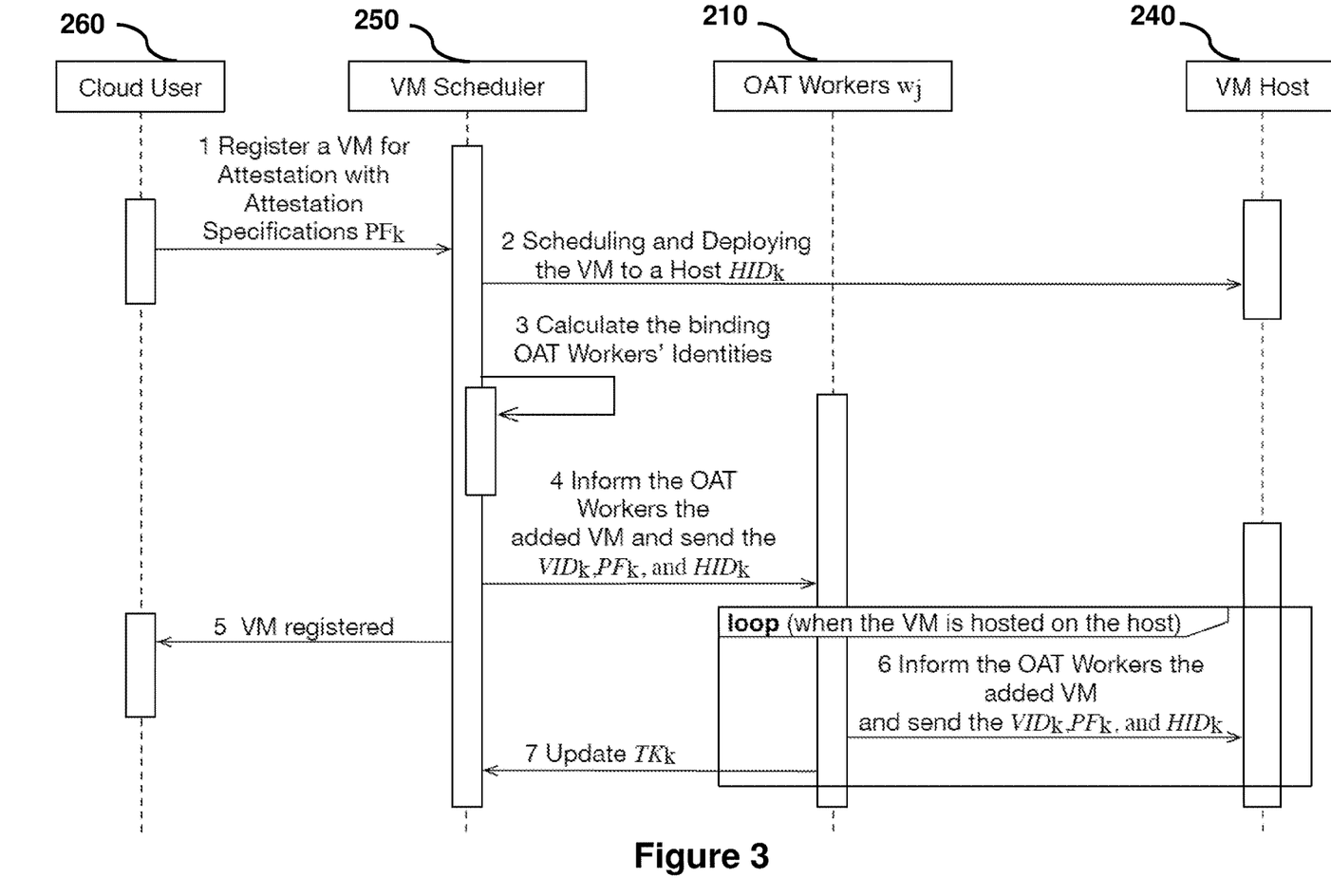
FIG. 3 is a signalling flow diagram illustrating initialisation of the system of FIG. 2.

FIG. 3 illustrates a method of VM Initialization using the distributed remote attestation system 200. When launching a VM (e.g. $VM_k$), the customer or cloud user 260 may specify and transmit an attestation profile (such as $PF_k$) to a VM scheduler 250. The VM scheduler 250 is provided within the cloud and is part of the cloud provider's system that processes the user's request for a new VM and decides where to start it etc. For example, the attestation profile may include the level of redundancy required by the particular customer 260 and/or the frequency of attestations. After the scheduler 250 has deployed the VM to a host 240, it collects the host's 240 $HID_k$ and calculates $VM_k$'s worker set $\{w_i\}$. It then transmits the $HID_k$ to these attestation servers or OAT workers 210, along with the optional attestation profile ($PF_k$). The workers 210 may now initiate attestations to the host 240. Workers 210 attest their managed VMs' hosts 240 by iterating the worker entries they maintain. As discussed with reference to FIG. 2 above, the worker entries may include the VM identity metadata, the attestation profile, the VM's host's 240 identity metadata and the host's 240 attestation tickets.

For each worker entry, the workers 210 attest the hosts 240 identified by the HID, conforming to the profile specified in $PF_k$. Before storing the returned attestation tickets, the workers 210 verify whether the attested host 240 is in fact hosting the target VM. This information is returned by the host 240 directly and is verified along with the host's 240 integrity. This helps preventing a "malicious" scheduler 250 (i.e. a scheduler which may have been the target of an attack) from specifying the wrong VM location information and hence improves security.

The above method of FIG. 3 therefore comprises the steps of:
1. a cloud user registering a VM for attestation with the VM scheduler with attestation specification $PF_k$,
2. scheduling and deploying the VM to a host $HID_k$ using the VM scheduler;
3. calculating the binding workers' identities using the VM scheduler;
4. using the scheduler to inform the workers of the added VM and sending the workers the $VID_k$, $PF_k$ and $HID_k$,
5. informing the cloud user that the VM is registered, using the VM scheduler;
6. using the workers to perform attestations (which may be repeated while the VM is hosted on the host);
7. sending the host's updated attestation ticket $TK_k$ to the VM scheduler using the workers.

Figure 4:
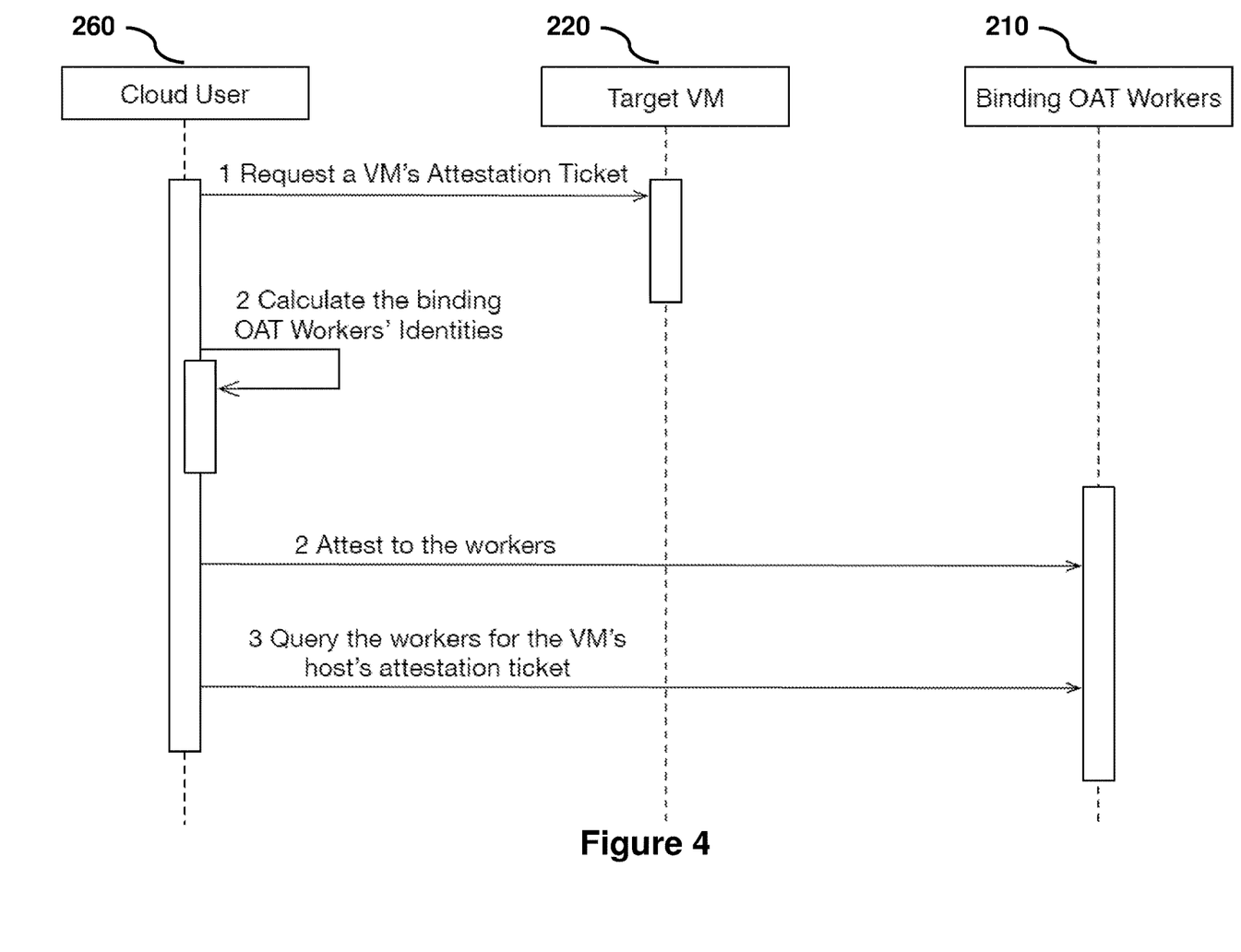
FIG. 4 is a is a signalling diagram illustrating attestation under the system of FIG. 2.

FIG. 4 depicts a method of attestation using the distributed remote attestation system 200. VM or cloud users 260 directly interact with the Trusted Computing facilities deployed inside the VM 220, such the OpenPTS, which queries the vTPM for the VM's 220 measurement value. The distributed attestation system 200 binds VMs' 220 vTPMs directly to their mapped workers' 210 underlying TPMs, instead of their local hosts'.

The TPM generates a signing key called the Attestation Identity Key (AIK) that is used for platform authentication, platform attestation and certification of keys. In an alternative embodiment, instead of binding directly to the mapped worker's TPM a cloud attestation identity key (cAIK) is created that is shared by the workers. The worker TPMs are then hidden behind the group cAIK which allows users to verify the instance vTPM state along with the state of the host and the workers without needing to know the physical TPM details of either host or workers. Host and worker states are signed by the cAIK and combined with VM states that are then signed by the vTPM to ensure that the trusted computing security is still strong due to the verification of every link in the chain. This means that end users would not need to know if a worker failed and was replaced.

With further reference to FIG. 4, the properties of the VM's host are attested by the VM's workers 210. In the event of a worker 210 failure, the distributed attestation system 200 will automatically reassign the new VM-worker mappings using the CRUSH algorithm, as described above. The VM users 260 firstly calculate the workers' 210 identities. They then query the workers 210 for the target hosts' properties. This also verifies that the VM 220 is located at target host and the VM's 220 vTPM is not tampered with. This therefore ensures the trustworthiness of the VM's 220 attestation ticket from the last step. The VM users 260 finally examine the trustworthiness of the workers 210 themselves by directly attesting them. Moreover, as multiple TSPs may participate, the users 260 are able to use the attestation results to identify any workers' 210 misbehaviours.

The method of FIG. 4 as described above comprises the steps of:
1. a cloud user requesting a VM's attestation ticket from a target VM;
2. the cloud user calculating the binding/mapped workers' identities;
3. the cloud user attesting the binding workers;
4. the cloud user querying the workers for the VM host's attestation ticket.

Figure 5:
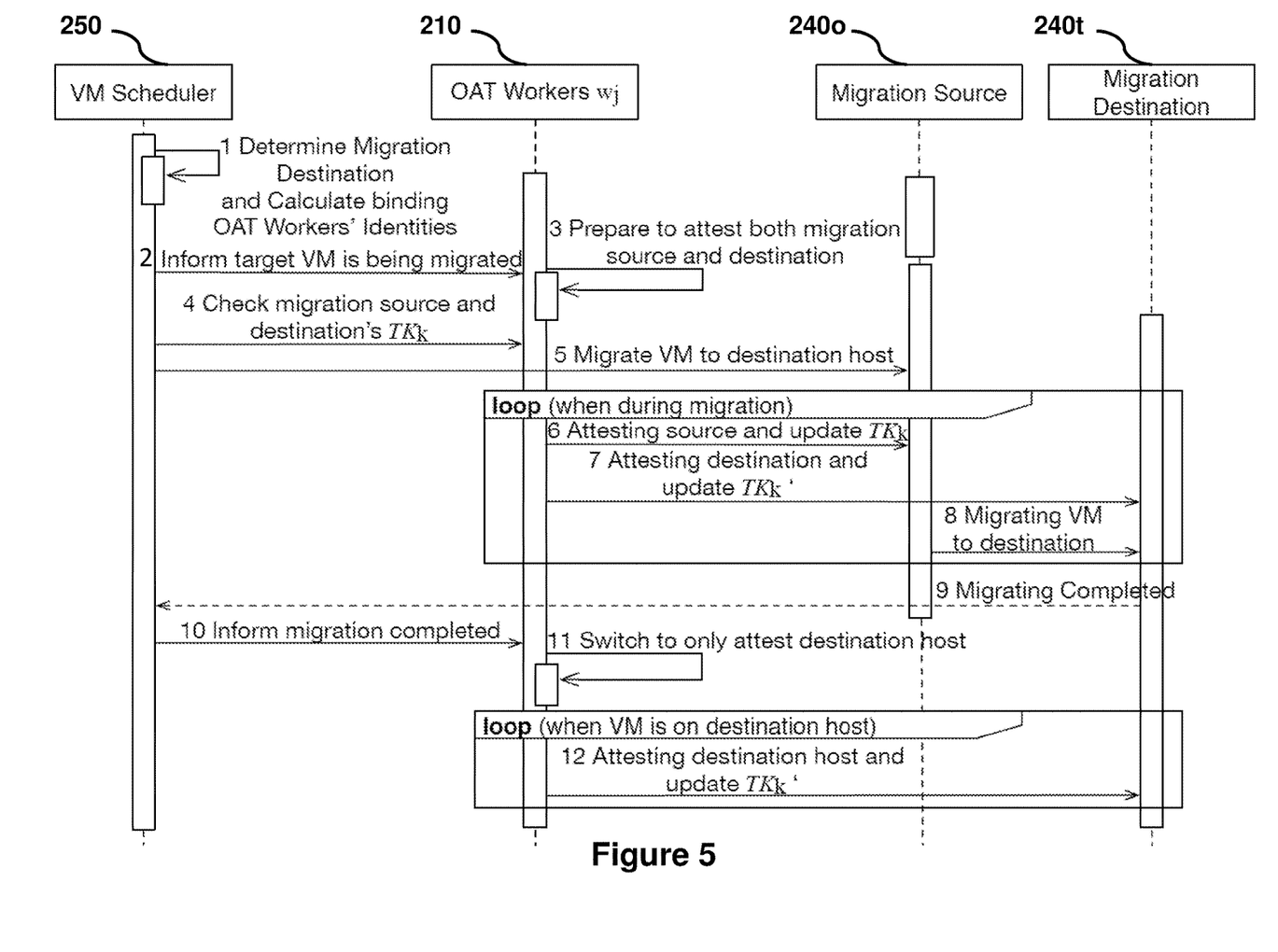
FIG. 5 is a signalling diagram illustrating VM migration under the system of FIG. 2.

FIG. 5 illustrates a method of VM Migration using the distributed attestation system 200. VMs may need to be migrated away from a host to allow the Service Provider to perform physical maintenance involving that host. Before the scheduler 250 starts to migrate a particular VM e.g. $VM_k$, it calculates the migration target host 240t for the VM. It then requests $VM_k$'s workers 210 to add a new entry by duplicating the original $VM_k$'s entry and changing the host's identity metadata $HID_k$ to reflect the new identity metadata of the target host 240t ($HID'_k$). This instructs the workers 210 to attest both the original 240o and target 240t hosts and ensures that the entire migration process is inspected. After a successful migration, the scheduler 250 informs the workers 210 to remove the original $VM_k$'s entry. At any time when either the source 240o or the destination 240t host fails the attestation, the migration is stopped.

The steps of the above method of migration as shown in FIG. 5 therefore comprise:
1. determining the migration destination (target host) and calculating the binding (mapped) workers' identities using the VM scheduler;
2. informing the mapped workers that the VM is being migrated, using the VM scheduler;
3. preparing to attest both the migration source (original host) and destination host, using the workers;
4. checking the source and destination hosts' ticket $TK_k$, with the workers using the VM scheduler;
5. begin migrating the VM to the destination host, using the VM scheduler;
6. attesting the source (original) host and updating the ticket $TK_k$, using the workers;
7. attesting the destination host and updating its ticket $TK_k'$ using the workers;
8. continue migrating the VM from the original host to the destination host; steps 6, 7 and 8 are repeated in a loop until the migration is complete or until an attestation fails and the migration is cancelled;
9. completing the migration;
10. informing the workers that the migration of the VM is complete, using the VM scheduler;
11. switching the workers to only attest the destination or new host;
12. attesting the destination or new host and updating the ticket $TK_k'$ using the workers.

Figure 6:
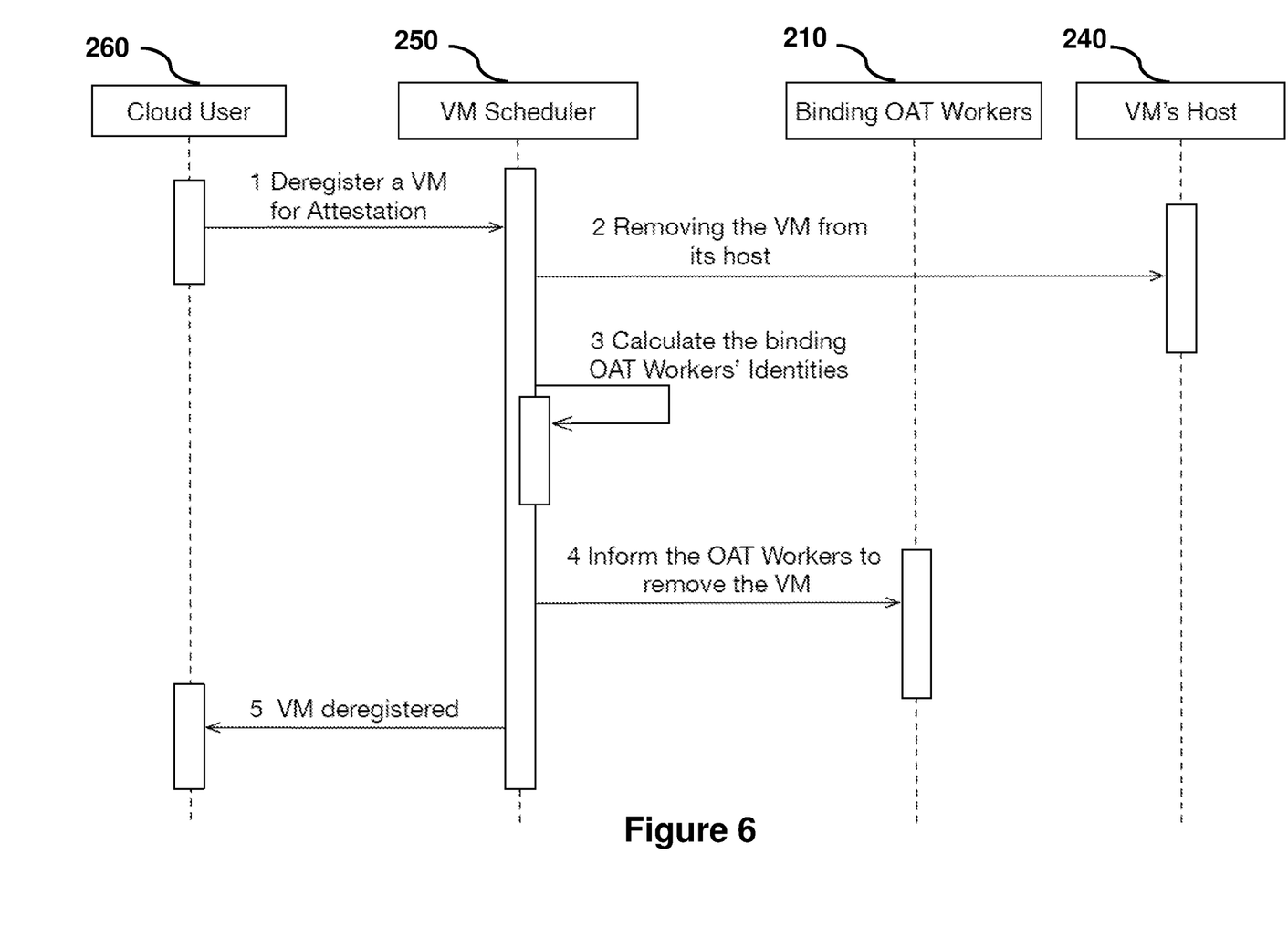
FIG. 6 is a signalling diagram illustrating VM termination under the system of FIG. 2.

FIG. 6 depicts a method of VM Termination using the distributed remote attestation system 200. When a VM e.g. $VM_k$ terminates, the scheduler 250 simply informs its allocated workers 210 to remove $VM_k$'s worker entries.

The method of FIG. 6 comprises the following steps:
1. receiving a request at the VM scheduler for deregistration of a VM for attestation from the cloud user;
2. removing the VM from its host, using the VM scheduler;
3. calculating the mapped/binding workers' identities, using the VM scheduler;
4. informing the workers to remove the VM, using the VM scheduler;
5. reporting to the cloud user that deregistration of the VM is complete, using the VM scheduler.

It will be appreciated that in the methods and systems described herein, the VM may be run as a normal VM with no special requirements. This makes the distributed attestation system extremely flexible.

Figure 7:
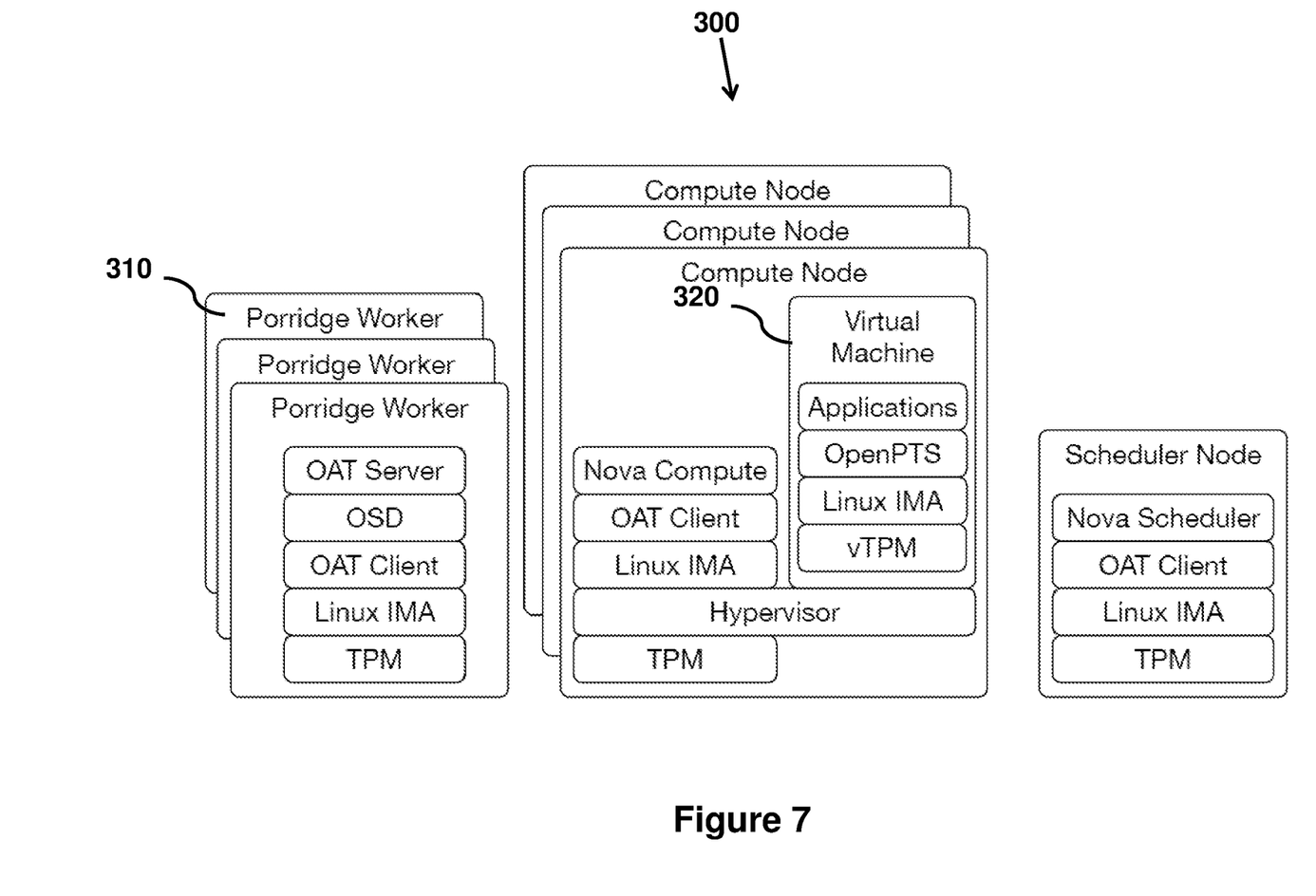
FIG. 7 illustrates an implementation of a distributed attestation system.

FIG. 7 depicts the implementation of a distributed attestation system 300 based upon the OpenStack cloud computing platform. The system can also be implemented for other cloud platforms. A worker or attestation server 310 (indicated in FIG. 7 as a Porridge Worker) is implemented by integrating a modified OAT (OpenAttestation) attestation server with each OSD (Object-based Storage Device). An OSD cluster is firstly created to implement the attack zone hierarchy. Each OSD is deployed with an OAT server, which runs an infinite loop to read the local OSD's data and enforces remote attestations. When receiving customers' attestation requests, instead of consulting an internal database, the OAT server searches its local OSD for the gathered attestation tickets. The Trusted Computing software stack is deployed on the workers 310 and the OAT server is extended to report its own attestation ticket for implementing the worker 310 attestations. Both the nova-scheduler and the nova-compute are modified to support the VM location reporting and confirming. To support host and VM attestations, OAT clients and the supporting Trusted Computing software stack are deployed on each host and VM 320. The vTPM facilities are also installed.

Figure 8:
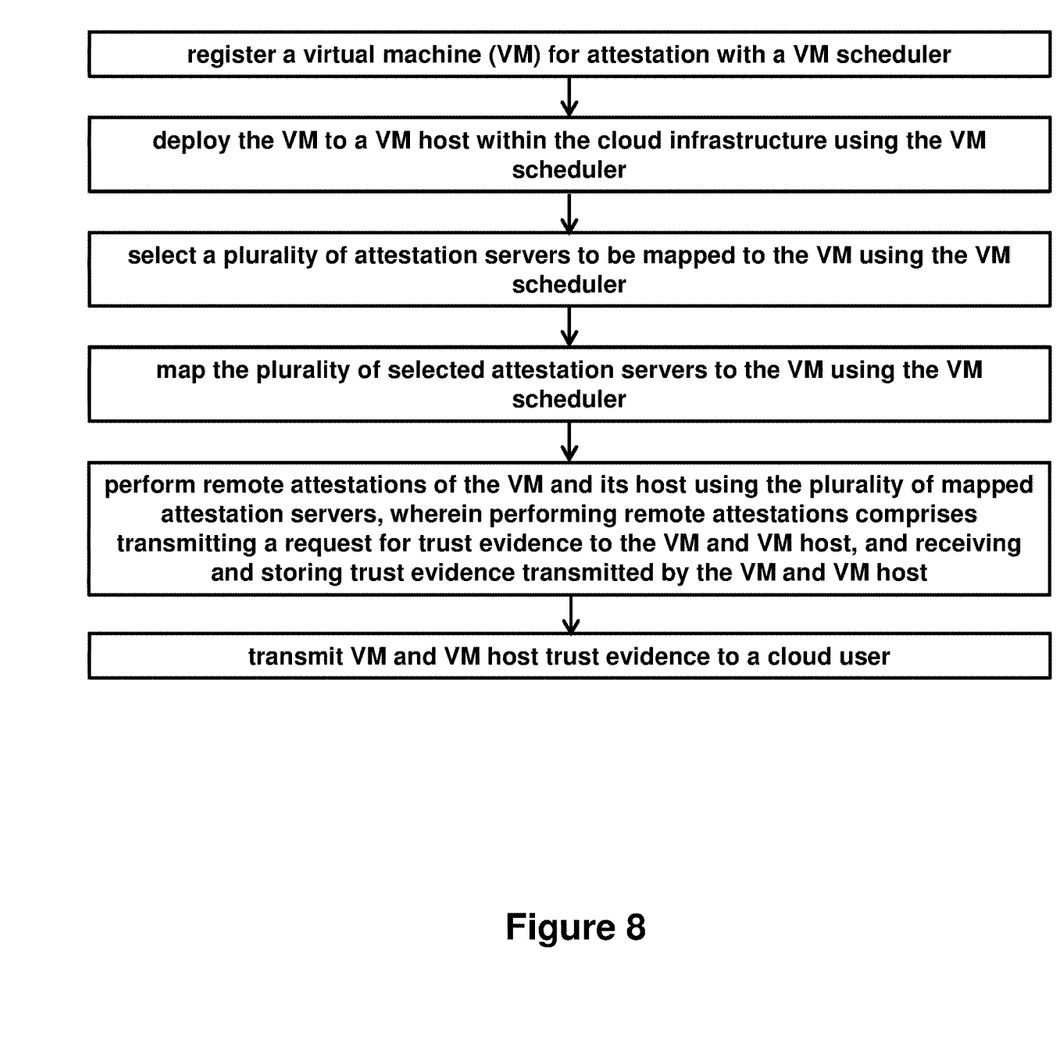
FIG. 8 is a flow chart illustrating a method of remotely attesting a cloud infrastructure.

FIG. 8 illustrates a method of remotely attesting a cloud infrastructure, using the distributed remote attestation system(s) described above.

The method comprises the steps of:
1. registering a virtual machine (VM) for attestation with a VM scheduler;
2. deploying the VM to a VM host within the cloud infrastructure using the VM scheduler;
3. selecting a plurality of remote attestation servers to be mapped to the VM using the VM scheduler;
4. mapping the plurality of selected remote attestation servers to the VM using the VM scheduler;
5. transmitting the VM and VM host identity data to the plurality of mapped remote attestation servers;
6. confirming registration of the VM using the VM scheduler;
7. performing remote attestations of the VM and its host using the plurality of mapped remote attestation servers, wherein performing remote attestations comprises transmitting a request for trust evidence to the VM and VM host, and receiving and storing trust evidence transmitted by the VM and VM host; and
8. transmitting VM and VM host trust evidence to the user The skilled person will be able to envisage other embodiments without departing from the scope of the appended claims.

For example, in a further embodiment, instead of launching a virtual machine (VM) into the cloud, cloud users may instead use the physical host to run data rather than a VM.

The attestations provided by the distributed remote attestation system described herein allow cloud customers to examine the detailed properties of their VM's hosts. In a further embodiment, the system may also attest other facilities inside the cloud, such as the storage or networking components which support the target hosts, for example. With this capability, cloud customers achieve more transparent VM controls inside the cloud, such as precisely defining the storage or networking capabilities for their VMs.

In yet another embodiment, an audit trail covering a VM's entire lifecycle inside the cloud is built from the collected trust evidence. This audit trail helps customers to effectively examine whether their VMs have received the intended services.

In yet another embodiment, when white-lists (which represent particular SLAs or data protection regulations and which may specify software permitted to run on the VM or cloud infrastructure) are registered with the distributed attestation system, the system will support continuous SLAs/regulations compliance inspections by constant attestation of the cloud infrastructure. Cloud customers or third-party auditors can further register event handlers, so that any violations of the white-list will be immediately dealt with in the manner specified in the event handler e.g. shutting down the VM and notifying the user.

In a further embodiment, when white-lists which record the expected applications and configurations that are allowed to be loaded inside the VMs are registered, the distribution attestation system will support the TPM-based intrusion detection system (IDS) for cloud customers, so that intruders can only disable the IDS by tampering with the trusted hardware. This significantly increases the intrusion difficulties.

In another embodiment, white-lists can be automatically generated by repeatedly attesting a VM while tracking the applications and configurations as they are installed into the VM. These automatic white-lists can then be used to configure the IDS.

In another embodiment, by only allowing cryptographic keys to be loaded inside the VMs which have been attested by the distributed attestation system, customers can precisely control the environment in which their keys will be operated. This is achieved by binding the keys with predefined white-lists, and continuously attesting to VMs processing the keys against the white-lists.

In a further embodiment, when using keys managed by the Trusted Key Management system to encrypt block/object storage, the distributed attestation system will facilitate Trusted Encrypted Block Storage or Trusted Encrypted Object Storage. Data stored in this kind of storage system can only be decrypted by the VMs and/or physical hosts passing the attestations against predefined white-lists.

In a still further embodiment, when using the distributed attestation system to attest the VMs launched inside an SGX (Software Guard Extensions) or other type of trusted enclave, cloud customers will be assured that not only the applications inside their VMs are correctly loaded, they are also protected from malicious memory tampering or eavesdropping.

Another embodiment builds upon the protection offered by above-mentioned white-lists which record and restrict the expected applications and configurations that are allowed to be loaded inside the VMs. One way of doing so is to only allow each VM to verify the other VM's compliance with the white-list.

A server (such as a database server) will only allow a client to connect if the client is compliant and the client will only connect to the server if the server is compliant. If the client loses compliance, it is blocked by the server and if the server loses compliance, the client shuts its connection.

Using a cluster of replicated database VMs, if one of the database VMs is compromised and so loses its compliance it is immediately shut down and a new database VM is created to replace it.

This system of remote verification can be used for any system that provides resources over the network as well as just databases e.g. object storage systems, Hadoop, VPNs, APIs etc.

As used herein, "trust evidence" relates to the collected output or integrity measurements of the vTPM and/or TPM that provide the measurement values indicating the status of a system including its applications and configurations.

As used herein, "attestation" relates to a mechanism to make verifiable statements for a system such as a VM as to its current status including its executable code and configuration.

Although the invention is described with respect to a cloud infrastructure the same concepts apply to a computing infrastructure.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A system arranged to provide remote attestation of a cloud infrastructure, comprising:
a plurality of attestation servers, each attestation server configured to be assigned to an attack zone of a plurality of attack zones, wherein each attack zone of the plurality of attack zones comprises a set of one or more attestation servers controlled by a single administrator, and wherein administration of a particular attack zone of the plurality attack zones is independent of any other attack zone of the plurality of attack zones;
a virtual machine (VM);
a VM scheduler arranged to register the VM for attestation and deploy the VM to a VM host within the cloud;
wherein more than one of said plurality of attestation servers are selected and mapped to the deployed VM, such that the deployed VM is attested by attestation servers distributed across one or more attack zones, and such that attestation responsibilities are substantially evenly distributed among the plurality of attestation servers; and
each of the more than one mapped attestation servers is arranged to perform remote attestations of the deployed VM and/or its VM host at boot and at intervals while the VM is running, wherein performing remote attestations comprises transmitting a request for trust evidence to the VM and VM host, receiving and storing trust evidence transmitted by the VM and VM host and transmitting VM and VM host trust evidence to a cloud user;
wherein each attestation server is configured to store identity data for each VM mapped thereto, said identity data comprising:
VM identity data ($VID_k$);
VM attestation data ($PF_k$);
VM host identity data ($HID_k$); and
VM host attestation tickets ($TK_k$) containing a hash giving the status of the host.

2. The system as claimed in claim 1, further comprising a cloud infrastructure.

3. The system as claimed in claim 1, wherein a VM is configured to be mapped to more than one of the plurality of attestation servers using a distributed hash table (DHT) algorithm, such that attestation responsibilities are substantially evenly distributed among the plurality of attestation servers.

4. The system as claimed in claim 1, wherein each of the more than one attestation servers is configured to store collected trust evidence from its mapped VM and VM host.

5. The system as claimed in claim 4, wherein each of the plurality of attestation servers is arranged to comprise a user query service, such that a cloud user can retrieve the stored trust evidence.

6. The system as claimed in claim 5, wherein the stored trust evidence comprises metadata, such that the VM host's real identity is not retrievable by the cloud user.

7. The system as claimed in claim 1, wherein the VM scheduler is configured to receive an attestation profile from a cloud user, the attestation profile specifying how attestation of the cloud user's VM and VM host is to be performed.

8. The system as claimed in claim 7, wherein each of the more than one attestation servers is configured to receive and store the attestation profile for its mapped VM.

9. The system as claimed in claim 1, wherein each of the plurality of attestation servers is configured to verify that an attested VM host is in fact hosting the mapped VM.

10. The system as claimed in claim 1, wherein, when a VM is migrated within the cloud between an origin VM host and a target VM host, each of the more than one attestation servers that are mapped to that VM are configured to attest the target VM host prior to migration of the VM.

11. The system as claimed in claim 1, wherein a cloud user is provided with trust evidence for each of the more than one attestation servers which are mapped to that cloud user's VM.

12. The system as claimed in claim 1, configured to enable deregistration of a deployed VM, wherein the more than one attestation servers mapped to the VM are informed of the deregistration after the VM has been removed from its VM host by the VM scheduler.

13. A system arranged to provide remote attestation of a cloud infrastructure, comprising:
 a plurality of attestation servers, each attestation server configured to be assigned to an attack zone of a plurality of attack zones, wherein each attack zone of the plurality of attack zones comprises a set of one or more attestation servers controlled by a single administrator, and wherein administration of a particular attack zone of the plurality attack zones is independent of any other attack zone of the plurality of attack zones;
 a physical host configured to run data within a cloud; and
 a scheduler arranged to register the physical host for attestation;
 wherein more than one of said plurality of attestation servers are selected and mapped to the physical host, such that the physical host is attested by attestation servers distributed across one or more attack zones, and such that attestation responsibilities are substantially evenly distributed among the plurality of attestation servers;
 each of the more than one mapped attestation servers is arranged to collect trust evidence for its mapped physical host; and
 wherein each attestation server is configured to store identity data for each VM mapped thereto, said identity data comprising:
  VM identity data ($VID_k$);
  VM attestation data ($PF_k$);
  VM host identity data ($HID_k$); and
  VM host attestation tickets ($TK_k$) containing a hash giving the status of the host.

14. A method of remotely attesting a cloud infrastructure, the method comprising:
 registering a virtual machine (VM) for attestation with a VM scheduler;
 deploying the VM to a VM host within the cloud infrastructure using the VM scheduler;
 selecting a plurality of attestation servers to be mapped to the VM using the VM scheduler, each attestation server configured to be assigned to an attack zone, wherein an attack zone comprises a set of attestation servers controlled by a single administrator, wherein the selecting is carried out such that the deployed VM is attested by attestation servers distributed across one or more attack zones, and such that attestation responsibilities are substantially evenly distributed among the plurality of attestation servers;
 mapping the plurality of selected attestation servers to the VM using the VM scheduler;
 performing remote attestations of the VM and its VM host at boot and at intervals while the VM is running using the plurality of mapped attestation servers, wherein performing remote attestations comprises transmitting a request for trust evidence to the VM and VM host, receiving and storing trust evidence transmitted by the VM and VM host;
 transmitting VM and VM host trust evidence to a cloud user; and
 wherein each attestation server is configured to store identity data for each VM mapped thereto, said identity data comprising:
  VM identity data ($VID_k$);
  VM attestation data ($PF_k$);
  VM host identity data ($HID_k$); and
  VM host attestation tickets ($TK_k$) containing a hash giving the status of the host.

15. The method as claimed in claim 14, further comprising:
 transmitting the VM and VM host identity data to the plurality of mapped attestation servers; and
 confirming registration of the VM using the VM scheduler.

16. The method as claimed in claim 14, further comprising selecting the plurality of attestation servers to be mapped to the VM using a Distributed Hash Table (DHT) algorithm.

17. The method as claimed in claim 14, further comprising:
 requesting trust evidence from the deployed VM;
 retrieving the identities of the plurality of mapped attestation servers and attesting the plurality of mapped remote attestation servers;
 requesting and receiving stored trust evidence from the plurality of mapped attestation servers.

18. The method as claimed in claim 14, further comprising migrating the deployed VM from an original VM host to a destination VM host, the method comprising:
 retrieving the identity of the destination host using the VM scheduler;
 retrieving the identities of the plurality of mapped attestation servers using the VM scheduler;
 retrieving trust evidence for the original and destination VM hosts from the plurality of mapped attestation servers using the VM scheduler;
 preparing a migration of the VM to the destination host, using the VM scheduler; the step of preparing comprising;
 attesting the original VM host and transmitting original VM host trust evidence to the VM scheduler, using the plurality of mapped attestation servers;
 migrating the VM from the original VM host to the destination VM host, using the scheduler;
 informing the plurality of mapped attestation servers that the migration is complete, using the VM scheduler;
 instructing the plurality of mapped attestation servers to attest only the destination host; and
 attesting the destination VM host and transmitting destination VM host trust evidence to the VM scheduler, using the plurality of mapped attestation servers.

19. The method as claimed in claim 14, further comprising deregistering the deployed VM, the method comprising:
 receiving a request at the VM scheduler for deregistration of a VM for attestation;
 removing the VM from its VM host, using the VM scheduler;
 identifying the plurality of mapped attestation servers' identities, using the VM scheduler;

informing the plurality of mapped attestation servers to stop attesting the VM, using the VM scheduler; and reporting that deregistration is complete, using the VM scheduler.

20. The method as claimed in claim 14, further comprising receiving an attestation profile from a cloud user using the VM scheduler, the attestation profile specifying how attestation of the cloud user's VM and VM host is to be performed, wherein performing remote attestations further comprises attesting the VM and VM host using the attestation profile.

21. The method as claimed in claim 20, wherein the attestation profile comprises a white list which records the expected applications and configurations that are allowed to be loaded inside the VM, the method comprising shutting down the VM and notifying the cloud user when applications and/or configurations not recorded by the white list are detected.

22. The method as claimed in claim 21, further comprising automatically generating white lists by repeatedly attesting the VM using the plurality of mapped attestation servers while tracking applications and configurations as they are installed onto the VM.

* * * * *